United States Patent

Milo et al.

[11] Patent Number: 5,169,668
[45] Date of Patent: Dec. 8, 1992

[54] PROCESS FOR LOW FAT SPREAD PRODUCTION

[75] Inventors: Bernd Milo, Hamburg; Rainer Ochmann, Kleve, both of Fed. Rep. of Germany

[73] Assignee: Van den Bergh Foods Co., Division of Conopco Inc., Lisle, Ill.

[21] Appl. No.: 513,701

[22] Filed: Apr. 24, 1990

[30] Foreign Application Priority Data

Apr. 28, 1989 [GB] United Kingdom ............... 8909803

[51] Int. Cl.$^5$ .............................................. A23D 7/00
[52] U.S. Cl. ..................................... 426/602; 426/603
[58] Field of Search ....................... 426/601, 602, 603

[56] References Cited

U.S. PATENT DOCUMENTS

| | | | |
|---|---|---|---|
| 4,209,546 | 6/1980 | Johansson et al. | 426/603 |
| 4,362,758 | 12/1982 | MacNeill et al. | |
| 4,366,180 | 12/1982 | Altrock et al. | 426/602 |
| 4,513,017 | 4/1985 | Moran et al. | 426/603 |
| 4,555,411 | 11/1985 | Moran et al. | 426/603 |
| 4,632,841 | 12/1986 | Parke et al. | 426/607 |
| 4,849,243 | 7/1989 | Sreenivasan et al. | 426/602 |
| 4,888,197 | 12/1989 | Wieske | 426/602 |
| 4,954,362 | 9/1990 | Wesdorp et al. | 426/602 |
| 4,959,239 | 9/1990 | Ernsting et al. | 426/581 |

FOREIGN PATENT DOCUMENTS 101104 2/1984 European Pat. Off. .
765870 1/1957 United Kingdom .
1129151 10/1968 United Kingdom .

*Primary Examiner*—Carolyn Paden
*Attorney, Agent, or Firm*—Rimma Mitelman

[57] ABSTRACT

The invention provides a process for the production of reduced-fat spreads which comprises emulsifying, cooling and working a mixture of oil and water in a process line including at least one crystallizer, preferably an A-unit, and a high shear inversion unit, preferably a C-unit, in which at least a part of the oil, preferably 4-8% wt of the oil, is injected into the process stream after the crystallizer and before the inversion unit, and apparatus for carrying out the said process.

9 Claims, 1 Drawing Sheet

PROCESS FOR LOW FAT SPREAD PRODUCTION

BACKGROUND OF THE INVENTION

The present invention falls in the technical field of edible spread processing and relates to a process for the preparation of edible spreads and to an apparatus for carrying out this process.

It is commonplace to use "Votator" (RTM) units in edible fat processing. These comprise both "A-units" and "C-units".

A-units, serve both to cool and crystallise an emulsion, whereas C-units, while also being used for crystallisation are also used to apply sufficient shear to induce phase inversion of a oil in water emulsion or premix to a water-in-oil dispersion. In spread manufacture by the phase inversion process, it is commonplace to separate the cooling and inversion steps, such that cooling occurs in one or more A-units in line, prior to a C-unit which functions as an invertor.

Our previous European patent EP 98664 discloses a process for producing a water-in-oil emulsion spread having a fat content of at most 60%, wherein an emulsion containing oil and water is both sheared and cooled in an apparatus internally coated with a layer of hydrophobic material selected from the group comprising PTFE and butter oil. In this process, fat flushing may be employed prior to start-up, so as to form the hydrophobic coating. No phase inversion occurs in this process.

European patents EP 98664 and EP 40874 both disclose the general process of fat-flushing prior to continuous process operation. In this process fat is first circulated through the process line and a cream is introduced until the required process conditions are attained. Again, this is not a true phase-inversion process.

It is difficult to maintain inversion with low fat levels especially if fats with high solids are being used. Problems in maintaining inversion are also caused when the process stream includes certain ingredients. Without wishing to restrict ourselves to any particular theory of operation, it is believed that the presence of, for example, oleaginous milk powders and other polar materials, in the process stream, hampers the inversion process. Such powders are considered important ingredients in edible spreads as they modify the organoleptic and physical properties of the products obtained.

Failure of the inversion process results in so-called "cold-flushing" of the process line resulting in production of a microbiologically unstable, and organoleptically unacceptable product. Cold flushing occurs when phase inversion fails to occur. Inversion may only be recovered by stopping and restarting the process which results in plant down-time and can result in loss of materials. The risk of inversion failure at a particular throughput often determines the maximum production capacity of a spread manufacturing line.

A further limitation on the capacity of some spread processing lines is the volume of product which may be packed in unit time. Products cannot normally be stored before they are packed and therefore the capacity of the packing apparatus is often a rate determining factor. There would be a great advantage in being able to double the throughput of a line as this would make it possible for a single line to serve two packing machines of the same capacity, and therefore to double capacity at the cost of a single packing machine.

SUMMARY OF THE INVENTION

It is an object of the invention to reduce the risk of cold-flushing in inversion processing when apparatus is operated at a high throughput.

We have now determined that by continuously, or semi-continuously injecting a small quantity of liquid fat, prior to the inversion unit, the above mentioned difficulties may be simply overcome, and much higher line throughput can be attained without risk of inversion failure. Surprisingly, we have found that this benefit is accompanied by an improvement in product properties.

Accordingly, the present invention provides a process for the production of reduced-fat spreads which comprises emulsifying, cooling and working a mixture of oil and water in a process line including at least one crystalliser and a high shear inversion unit, CHARACTERISED IN THAT at least a part of the oil is injected into the process stream after the crystalliser and before the inversion unit.

Typically, the crystalliser is a tubular heat exchanger, of the A-unit type described above, although this may be replaced by alternative cooling means, such as a simple jacketed tube.

Preferably the invertor is a C-unit of the type described above.

It is believed that this oil injection facilitates inversion and thereby makes it possible to decrease the invertor pin speed and lower the power input. This reduces the amount of kinetic energy impressed on the product and results in a lowering of final temperature in the invertor. This is important when the quantity of solid fat in the invertor is critical for phase inversion to occur.

Typically, the injected portion of oil comprises 2-12% by weight of the total fat phase content of the eventual product. Preferably, the injected quantity of oil is 4-8% by weight of the total fat content. We have determined that by injecting this quantity of oil, the throughput of the apparatus can be increased by up to a factor of two at an industrial scale.

Oil soluble ingredients such as emulsifiers, antioxidants, colouring agents and flavours may be placed in the injected part but better results have been obtained when the oil soluble ingredients are present in the bulk of the process stream.

Spreads production lines often comprise a sequence of several "A" and/or "C" units as described above. In a preferred embodiment the process aspect of the invention comprises emulsifying, cooling and working a mixture of oil and water in a process line including at least two A-units and at least one C-unit in an AAC sequence wherein the part of the oil injected enters process stream after the first A-unit and before the C unit. Most preferably, injection occurs between the second A-unit and the C-unit.

While the oil can be injected at the process stream temperature, in certain embodiments of the invention the oil is injected at a higher temperature preferably in the range 40°-80° C., especially when injection is before the second A-unit.

Additionally the present invention comprises a spread processing line including at least two A-units and at least one inverting C-unit in an AAC sequence and means for injecting edible oil into the process stream after the first A-unit and before the inverting C unit.

In order that the present invention may be better understood it will be further explained by way of examples of the practice of the invention in the manufacture of 40% fat butter-based spreads and with reference to the accompanying drawings wherein:

DESCRIPTION OF THE PREFERRED EMBODIMENTS

Examples

Figure 1:
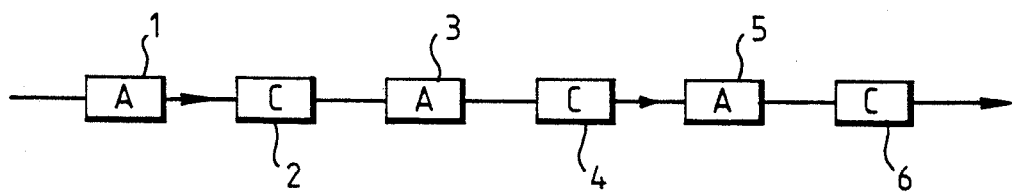
FIG. 1 (PRIOR ART) shows a conventional spreads production line.

A conventional spreads production line is shown in FIG. 1. A mixed fatphase and waterphase enters at the left hand side of the diagram and passes to the right at a maximum flow rate of some 80 kg/hr. The VOTATOR sequence comprises (1) a first A-unit, (2) a first C-unit, (3) a second A-unit, (4) a second C-unit serving as an invertor, (5) a third A-unit and (6) a third C-unit. The temperature of the process stream at the entry of the second C-unit is commonly between 5° and 15° C.

Figure 2:
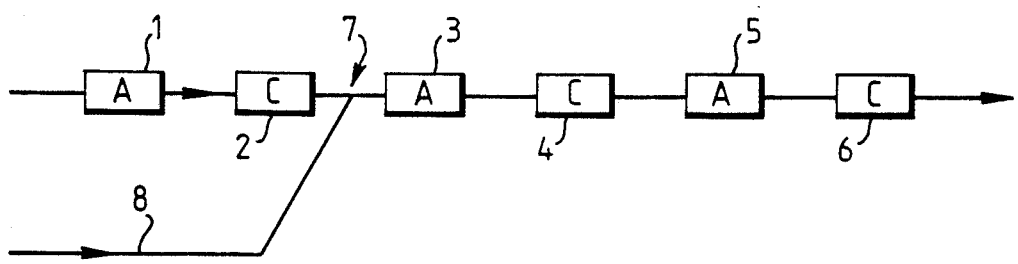
FIG. 2 shows a spreads production line modified according to one embodiment of the present invention, and, FIG. 3 shows a spreads production line modified according to a further embodiment of the present invention.

A spreads production line modified according to a first embodiment of the present invention "method (A)" is shown in FIG. 2. The same numbering is used as in FIG. 1, with the addition that (7) is the entry point into the process stream of the injected fat carried along line (8). It is noted that injection occurs after the first C-unit (2) and before the second A-unit (3).

Figure 3:
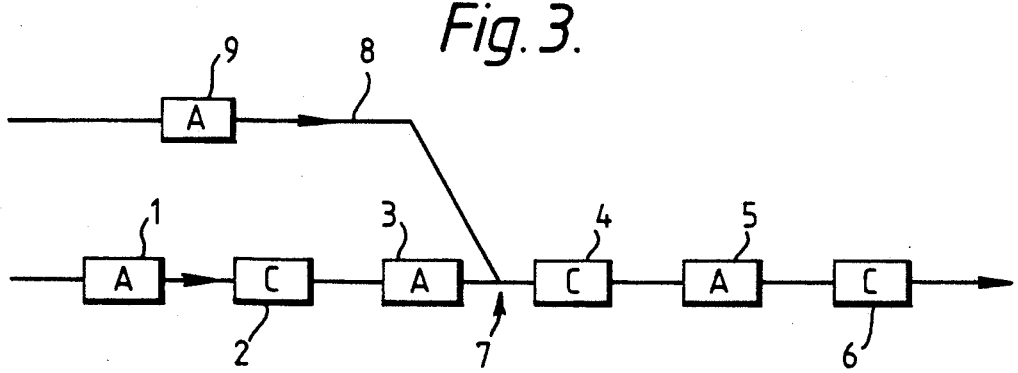

A spreads production line modified according to a further embodiment "method (B)" of the present invention is shown in FIG. 3. As with FIG. 2 the numbering used in FIG. 1 has been employed, and again there is shown the addition of the entry point (7) for the injected fat phase and line (8) for the supply of this phase. It is noted that injection occurs after the second A-unit (3) but before the second C-unit (4) which serves as the invertor. An additional feature shown in this figure is the additional A-unit (9) which serves to cool the injected oil in flow line (8).

In order to compare the process of the present invention with the methods of the prior art a standard low calorie butter formulation was processed both according to the present invention as illustrated in FIG. 2 and according to the method illustrated in FIG. 1.

The formulation comprised as follows, all percentages being expressed as wt% on final product:

| | | |
|---|---|---|
| Skim Milk Powder | 1% | |
| Gelatine | 3% | |
| Butterfat | 40% | |
| Water | 56% | |

In the comparative experiment all the above ingredients were combined into a generally oil in water emulsion pre-mix as is known in the art. This premix was fed along the operating process line of FIG. 1 at a varying throughput. As the process stream passed through units (1)-(3) it was cooled and worked. Phase inversion occurred in unit (4) to form a water in oil spread which was further worked and cooled in units (5)-(6). The product was acceptable as an average low-calorie butter. It was determined that the maximum throughput which could be maintained with this process line was around 80 kg/hr. Above this value it proved progressively more difficult to maintain phase inversion in unit (4) without cold-flushing as described above.

In a first set of trials 2-8% by weight of the fat phase was injected at point (7), according to the method (A) as shown in FIG. 2. and the throughput increased to the point at which inversion failed. The temperature of the injected oil was 40°-80° C. The oil was heated by the use of a hot water jacketed tank prior to injection. No other process parameters were varied. It was determined that the throughput could by this method be increased to 160 Kg/hr without loss of phase inversion in unit (4).

The injection apparatus comprised a dosing pump capable of delivering oil at above the line pressure. A "Bran & Luebbe" (Registered Trade Mark) oil-dosing pump was found suitable. Such pumps are commonly employed upstream in the process line to dose oil and water phase together. The injection point was formed by fitting a "T-head" into the process stream.

The products prepared according to "method A" were compared with the controls as prepared above. No difference is taste was noted by an expert panel. However a significant improvement in the melting properties and consistency of the product was noted when the injection comprised 4-8% of the fat phase by weight of that phase.

In a second set of trials 4-12% of the fat phase was injected at point (7), according to the method (B) as shown in FIG. 3. and the throughput increased to the point at which inversion failed. The oil was injected at a temperature of 5°-15° C., having been cooled with an A-unit type scraped surface heat-exchanger. No other process parameters were varied. It was determined that the throughput could by this method be increased to 150 Kg/hr without loss of phase inversion in unit (4).

The products prepared according to method (B) were compared with the controls by an expert panel. Again, while no difference in taste could be perceived the products were of a better consistency and had improved melting properties. As with method A the best results were obtained with injection of from 4-8% of the fat phase by weight of that phase.

From the above results it is seen that the present invention can enable an increase of process throughput of up 100% as compared to the conventional process. This doubling of the throughput is accomplished without doubling the energy cost.

The above method (B) was repeated at industrial scale with a 108 liter C-unit of the "Merksator MF153H" (Registered Trade Mark) type. This is normally operated at a throughput of 700-800 kg/h with the above mentioned composition. Using method (B) it was possible to increase throughput to 1.5 tonnes/hr, with the same risk of inversion failure and without any reduction in product quality.

What is claimed is:

1. A process for the production of reduced fat spreads which comprises emulsifying, cooling and working a mixture of oil and water in a process line including at least one crystallizer and a high shear inversion unit, wherein phase inversion of the mixture occurs in the inversion unit and wherein at least part of the oil is injected into the process stream after the crystallizer and before the inversion unit.

2. A process according to claim 1 wherein the crystalliser is a tubular heat exchanger, of the A-unit type.

3. A process according to claim 1 wherein the inversion unit is a pin stirrer of the C-unit type.

4. A process according to claim 1 wherein the injected portion of oil comprises 2-12% by weight of the total fat phase content of the eventual product.

5. A process according to claim 4 wherein the injected quantity of oil is 4-8% by weight of the total fat content.

6. A process according to claim 1 wherein the process line including at least two A-units and at least one C-unit in an AAC sequence and the injected oil enters the process stream after the first A-unit and before the C-unit.

7. A process according to claim 6 wherein the injected oil enters the process stream after the second A-unit.

8. A process according to claim 1 wherein the injected oil is at a temperature at or above the temperature of the process stream.

9. A process according to claim 8 wherein the temperature of the injected oil is in the range 40°-80° C.

* * * * *